H. J. OTTO.
TIRE CASING REPAIR TOOL.
APPLICATION FILED JULY 1, 1918.
1,380,008.
Patented May 31, 1921.
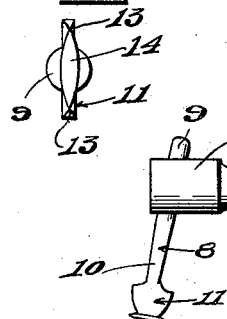
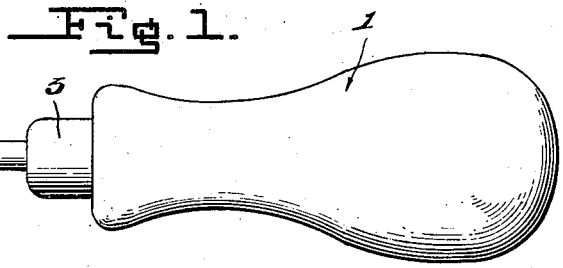
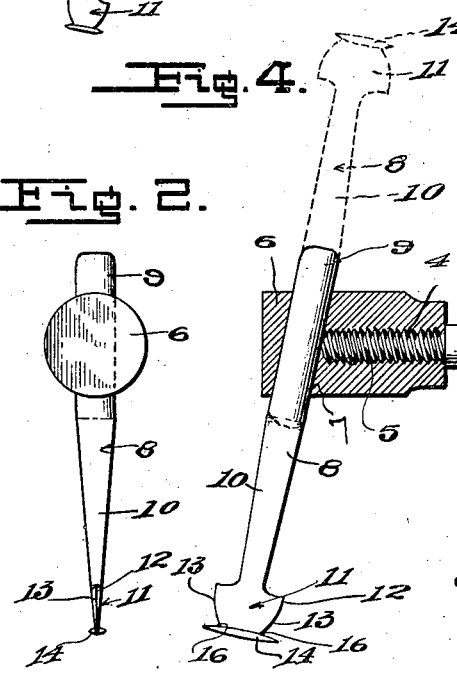
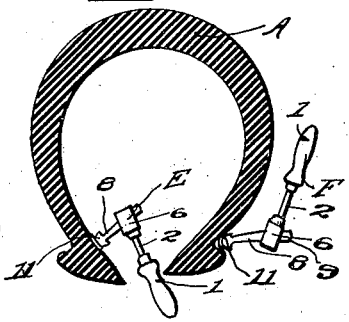
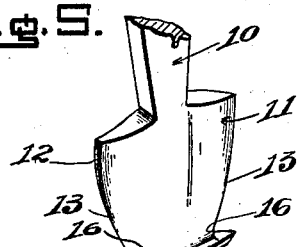
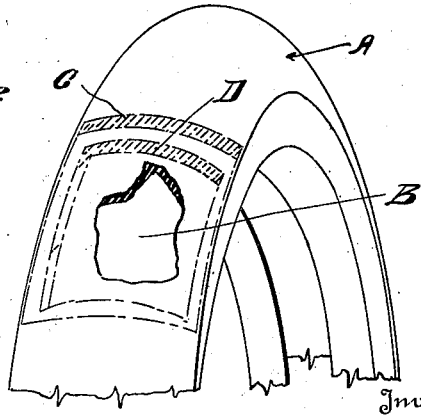
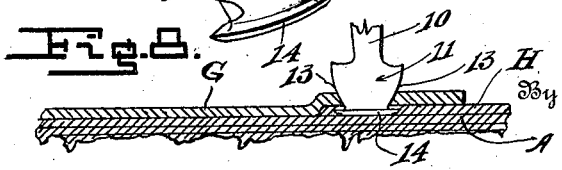
Inventor
H. J. Otto.

UNITED STATES PATENT OFFICE.

HENRY J. OTTO, OF EVANSVILLE, INDIANA.

TIRE-CASING-REPAIR TOOL.

1,380,008. Specification of Letters Patent. Patented May 31, 1921.

Application filed July 1, 1918. Serial No. 242,785.

*To all whom it may concern:*

Be it known that I, HENRY J. OTTO, a citizen of the United States, and a resident of Evansville, in the county of Vanderburg and State of Indiana, have invented certain new and useful Improvements in Tire-Casing-Repair Tools, of which the following is a specification.

This invention relates to a tool for stepping or cutting away parts of a tire casing or shoe in repairing blowouts, punctures or other ruptures of a tire casing.

In repairing ruptured tire casings or shoes it is the common practice to cut away the layers of the casing in stepped relation about the rupture, then place inserts in the openings thus formed and the repair portion of the tire is then thoroughly vulcanized. In cutting away the portions of the tire it is necessary to avoid cutting the next inward layer to the one being cut, as such cutting weakens the casing structure; and it is an object of this invention to provide a tool for cutting away the layers of a tire casing with a clean cut without in any way cutting or mutilating the next inward layer, and in a relatively short time, the tool being provided with a substantially oval runner or guard at the inner edge of the blade, having slight rises at its ends to prevent cutting or casting of the guards in the inward layer of the tire casing next to the one being cut.

Another object of the invention is to provide a tool as specified embodying a handle portion having a bit carrying head removably mounted thereon which head adjustably carries the bit of the tool to permit adjustment of the bit at various angles and positions with respect to the handle, allowing the cutter to work in close places such as near the rim or bead of a tire casing, inside a stiff casing and enable it to be adjusted for convenient use in cutting various portions of the exterior of the tire casing preventing awkward and consequently slow movement of the tool.

In the construction of many types of ordinary tire casings or shoes, splices, or the overlapping of the meeting ends or edges of the layers of the tire are curved, and it is also an object of this invention to provide a cutting blade or bit for a tool as specified which will cut through the overlapping portions of both layers in a clean straight line.

Other objects of the invention will appear in the following detailed description, taken in connection with the accompanying drawing, and forming a part of this specification, in which drawing:

Figure 1 is a side elevation of the tire casing repair tool.

Fig. 2 is an enlarged end view of the tool.

Fig. 3 is an enlarged bottom plan of the bit of the tool.

Fig. 4 is an enlarged fragmentary section through the bit carrying head or chuck of the tool showing the bit in different positions with respect thereto one of which positions is shown in dotted lines.

Fig. 5 is an enlarged detail perspective of the cutting blade of the bit structure.

Fig. 6 is a section through an ordinary tire casing showing different positions of the tool with respect to the casing.

Fig. 7 is a fragmentary perspective view of a tire casing illustrating in dot and dash lines the manner of cutting out or stepping the layers of the tire to repair a rupture or blow out thereof.

Fig. 8 is a fragmentary perspective view through a tire casing showing the overlapping of the meeting ends of two layers of the tire and also illustrating the manner in which the blade of the tool cuts therethrough.

Referring more particularly to the drawing, 1 designates the handle of the tool which is shaped to be conveniently gripped by the hand of the user of the tool and which has a stem 2 connected thereto in the usual manner by means of a ferrule 3. The outer end of the stem 2 is reduced in diameter and threaded as shown at 4, extending into the threaded bore 5 of the chuck or bit carrying head 6 which is detachably connected to the stem 2 by the threaded engagement of the reduced end for the stem in the bore 5.

The head 6 is provided with an opening 7 extending diametrically therethrough which opening is positioned at an acute angle to the radii of the head or chuck, causing the bit 8 when connected to the head to extend at an acute angle to the stem 2, either inclining outwardly from the handle as shown in solid lines in Fig. 4 of the drawing or inwardly toward the handle as indicated in dotted lines in Fig. 4 of the drawing. These different positions of the tool permits its convenient manipulation in various positions about a tire, as will be mentioned in detail hereafter.

The upper end 9 of the bit 8 is circular in cross section and snugly fits within the opening 7. The inner end of the reduced threaded end 4 of the stem 2 engages against the end 9 of the bit 8, for binding the bit in adjusted positions with respect to the head 6. The shank 10 of the bit 8 tapers as it extends outwardly from the circular portion 9, having its side edges converging, as clearly shown in Fig. 2 of the drawing. The cutting blade 11 is formed integrally with the shank 10 at the lower end of the same and its sides gradually converge as they extend downwardly from the upper end of the head as shown at 12 in Fig. 5, forming cutting edges 13. The edges of the blade 11 curve inwardly toward the longitudinal center of the blade as they extend downwardly and merge into the upper surface of the blunt base or runner 14 formed integrally upon the lower ends of the blade 11. The blunt base or runner 14 is substantially oval-shaped in plan, having its under surface rising at its ends, forming relatively sharp points at the end of the blunt base or runner. The lower or under surface of the blunt base or runner 14 is convexly curved, for rising over and preventing the gouging or hanging of the blade upon a layer of fabric of a tire casing which is inwardly of the layers being cut. If it is so desired, the cutting edges 13 of the blade 11 may be concavely curved as shown at 16, in Fig. 5 for presenting a concavo-convex cutting edge to the fabric of the tire casing.

Fig. 7 illustrates the manner of stepping or cutting away the layers of a tire indicated by the letter A, about a blow-out or rupture B thereof. The layers C and D are cut away in stepped relation, about the rupture B, as indicated in dot and dash lines to provide suitable openings for receiving inserts which are afterward vulcanized through the tire for repairing the same.

In Fig. 6 of the drawing, the improved tool is shown in various positions with respect to the tire, illustrating the convenience with which various portions of the tire that are normally difficult to reach, may be cut with the tool. At a position E, the bit 8 of the tool is adjusted to incline toward the handle 1 thereof, so as to permit convenient access to the interior of a stiff casing or shoe for cutting away portions of the inner layer thereof and at the position F, the bit 8 is adjusted to incline outwardly from the end of the head 6 and handle 1, permitting the blade 11 to be positioned for cutting away portions of the casing A near the bead thereof and illustrating, the convenience with which portions of layers of the tire casing may be cut away at this part of the tire.

Fig. 8 of the drawing, shows the common splice or overlapping of the meeting ends of layers G and H of a tire A, and also shows how the cutting blade 11 will cut through the overlapping portions of the layers in a clean straight line cut. There have been tools devised, for repairing tire casings, but one of the chief disadvantages of certain of said tools is that the cutting blade is so short and thick that it will not cut through the overlapping ends of two layers of fabric of a tire casing at one stroke or cut and where it engages the overlapping ends as shown in Fig. 8, it mutilates, by ragged cutting or gouging, either one or both of the overlapping ends, which undesirable features are overcome by the provision of the relatively long blade 11 and the particular construction of its cutting edges as previously described.

It will also be noted from the drawings and the above description that the cutting blade 11 may be adjusted to extend transversely or at right angles to the longitudinal axis of the stem 2, to cut the fabric laterally on the inside of a tire casing.

The cutting blade 11 is formed of tempered tool steel and the action of drawing it through the layers of the tire will whet or sharpen the blade, thereby rendering manually sharpening of the blade unnecessary.

Changes in details may be made without departing from the spirit of the invention, but:

I claim:

1. A tool for stepping tire casings in repairing blowouts, comprising a bit provided upon its end with a flat blade tapering in thickness outwardly from the bit and terminating at its outer edge portion in a knife edge, said flat blade having upon its reduced end an enlarged shoe of greater length than the width of the blade and merging at opposite ends into the knife edges of the blade.

2. A tool for stepping tire casings in repairing blowouts, comprising a bit, a flat blade carried on the end of the bit and tapering in thickness outwardly from the bit and toward the opposite edges of the blade to form cutting edges at the said edges of the blade, and a shoe arranged upon the outer end of the blade and being of greater width than said end of the blade and of greater length than the width of the blade, said shoe having a lower convexed face and merging at opposite ends into the edge portions of the blade.

3. A tool for stepping tire casings in repairing blowouts, comprising a bit having near one extremity a flattened blade portion provided with oppositely disposed cutting edges adapted to simultaneously sever a plurality of layers of the casing fabric, said blade being provided with an enlarged shoe member also having oppositely disposed cutting edges and adapted to prevent said blade portion from severing more than a predetermined number of layers of fabric.

HENRY J. OTTO.